(12) United States Patent
Wu et al.

(10) Patent No.: US 9,569,854 B2
(45) Date of Patent: Feb. 14, 2017

(54) IMAGE PROCESSING METHOD AND APPARATUS

(71) Applicant: TENCENT TECHNOLOGY (SHENZHEN) COMPANY LIMITED, Shenzhen (CN)

(72) Inventors: Lei Wu, Shenzhen (CN); Zhu Liang, Shenzhen (CN); Bo Ren, Shenzhen (CN); Xiaoming Huang, Shenzhen (CN); Mengxi Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/109,345

(22) PCT Filed: Jun. 12, 2015

(86) PCT No.: PCT/CN2015/081318
§ 371 (c)(1),
(2) Date: Jun. 30, 2016

(87) PCT Pub. No.: WO2015/192738
PCT Pub. Date: Dec. 23, 2015

(65) Prior Publication Data
US 2016/0328853 A1   Nov. 10, 2016

(30) Foreign Application Priority Data

Jun. 17, 2014 (CN) .......................... 2014 1 0271385

(51) Int. Cl.
*G06K 9/00* (2006.01)
*G06T 7/00* (2006.01)
(Continued)

(52) U.S. Cl.
CPC .......... *G06T 7/0051* (2013.01); *G06K 9/4604* (2013.01); *G06K 9/4671* (2013.01); *G06K 9/52* (2013.01);
(Continued)

(58) Field of Classification Search
CPC .. H04N 19/117; H04N 19/167; H04N 5/2226; G06K 9/00228; G06K 9/46; G06T 2207/20144
See application file for complete search history.

(56) References Cited

U.S. PATENT DOCUMENTS

2007/0286520 A1* 12/2007 Zhang ................ G06K 9/00228
382/264
2008/0259154 A1   10/2008 Garrison et al.
(Continued)

FOREIGN PATENT DOCUMENTS

| CN | 101764925 A | 6/2010 |
| CN | 102932541 A | 2/2013 |
| CN | 103152521 A | 6/2013 |

OTHER PUBLICATIONS

Huang et al., "Real-time depth-of-field simulation on GPU", Application Research of Computers, vol. 25, No. 10, Oct. 2008, 3 pages (translation of abstract only).
(Continued)

*Primary Examiner* — Li Liu
(74) *Attorney, Agent, or Firm* — Marshall, Gerstein & Borun LLP (57) ABSTRACT

The present disclosure discloses an image processing method and apparatus. The image processing method comprises: obtaining a two-dimensional image; determining a target area on the two-dimensional image, wherein the two-dimensional image includes a background area and a target area, and the background area is an area outside of the target area; detecting a location of the target area on the
(Continued)

two-dimensional image; selecting, according to the location of the target area on the two-dimensional image, a default processing manner used to perform blurring processing on pixels of the background area; and performing the blurring processing on the pixels of the background area according to the default processing manner. The present disclosure solves a problem that in the prior art, the blurring processing manner cannot be adjusted accordingly depending on different target areas on the an image. Therefore, for different target areas, corresponding blurring processing manners thereof are adopted.

12 Claims, 6 Drawing Sheets

(51) Int. Cl.
G06T 11/60 (2006.01)
G06T 5/00 (2006.01)
G06K 9/46 (2006.01)
G06K 9/52 (2006.01)
G06T 3/00 (2006.01)
G06T 7/60 (2006.01)

(52) U.S. Cl.
CPC ............. *G06T 3/0093* (2013.01); *G06T 5/002* (2013.01); *G06T 7/0042* (2013.01); *G06T 7/0085* (2013.01); *G06T 7/60* (2013.01); *G06T 11/60* (2013.01); *G06K 2009/4666* (2013.01); *G06T 2200/21* (2013.01); *G06T 2207/20144* (2013.01)

(56) References Cited

U.S. PATENT DOCUMENTS

| | | | | |
|---|---|---|---|---|
| 2010/0266207 | A1* | 10/2010 | Zhang | G06T 5/003 382/195 |
| 2014/0355671 | A1* | 12/2014 | Peng | H04N 19/115 375/240.03 |
| 2015/0195491 | A1* | 7/2015 | Shaburov | H04N 7/15 348/14.12 |

OTHER PUBLICATIONS

International Search Report and Written Opinion, International Application No. PCT/CN2015/081318, mailed Aug. 14, 2015.

* cited by examiner

IMAGE PROCESSING METHOD AND APPARATUS

CROSS-REFERENCE TO RELATED APPLICATION

This application is a national phase of International Application PCT/CN2015/081318 filed on Jun. 12, 2015, which claims benefit of and priority to Chinese Patent Application No. 201410271385.5 filed on Jun. 17, 2014 entitled "Image Processing Method and Apparatus". The entire disclosures of each of the above applications are incorporated herein by reference.

FIELD OF THE TECHNOLOGY

The present invention relates to the field of image processing, and in particular, to an image processing method and apparatus.

BACKGROUND OF THE DISCLOSURE

Depth of field refers to a range behind and in front of a focus point that appear sharp. Depth of field can decide whether to blur a background to highlight a photographed object or display a sharp background. For a two-dimensional image, a depth of field effect may be simulated by performing some processing, so as to achieve the objective of highlighting an object on an image.

An existing depth of field effect simulation solution usually adopts a pinhole imaging model based filtering solution. In the solution, a depth value z of each pixel is calculated according to a standard pinhole camera model; a circle of confusion (a circle of confusion: on an imaging plane in front of, or behind, or near a focal plane, light rays from a point light source do not focus on a point, so that the image becomes a circle of confusion) for each sampling point is calculated according to the depth value z, aperture, focus length, and the like; a final value of each pixel is determined by a weighted average of all circles of confusion covering the pixel thereof. In the solution, in a simulation calculation process based on a pinhole imaging model or a lens model, the focus length and aperture parameters of a camera needs to be know in advance; however, in actual application, it is difficult to obtain camera photographing parameters of any two-dimensional image with accuracy, so that application scenarios of the solution are restricted, and the depth of field effect simulation cannot be performed on any two-dimensional image. In addition, because the calculation process of the solution needs to depend on parameters of a camera, the calculation process is complex and the calculation amount is huge.

In addition, a solution of blurring a background layer by layer around a human face area is adopted. The solution is blurring the background layer by layer around the human face area based on a human face recognition technology. The disadvantages thereof lie in that the human face recognition technology only applies to portrait scenarios; and in this solution, depth of field is simulated by adopting a manner of performing gradient blurring around a center, and parameters for blurring processing are fixed, so that the blurring processing manner cannot be adjusted accordingly depending on different target areas on the an image and a single depth of field effect is appeared; therefore, the impact of pixel depth information on the blurring degree thereof cannot be effectively reflected. However, the depth of field effect photographed by an actual camera varies depending on focus length, aperture, and object distance, which results a feature of one-way or two-way gradient blurring. A target area is an area where a highlighted object is located.

SUMMARY

To achieve the foregoing objectives, an image processing method is provided according to one aspect of an embodiment of the present invention. The image processing method according to the embodiment of the present invention comprises: obtaining a two-dimensional image; determining a target area on the two-dimensional image, wherein the two-dimensional image includes a background area and a target area, and the background area is an area outside of the target area; detecting a location of the target area on the two-dimensional image; selecting, according to the location of the target area on the two-dimensional image, a default processing manner used to perform blurring processing on pixels of the background area; and performing the blurring processing on the pixels of the background area according to the default processing manner.

To achieve the foregoing objectives, an image processing apparatus is provided according to another aspect of an embodiment of the present invention. The image processing apparatus according to the embodiment of the present invention comprises: an obtaining unit, configured to obtain a two-dimensional image; a determining unit, configured to determine a target area on the two-dimensional image, wherein the two-dimensional image includes a background area and a target area, and the background area is an area outside of the target area; a detecting unit, configured to detect a location of the target area on the two-dimensional image; a selecting unit, configured to select, according to the location of the target area on the two-dimensional image, a default processing manner used to perform blurring processing on pixels of the background area; and a first processing unit, configured to perform the blurring processing on the pixels of the background area according to the default processing manner.

BRIEF DESCRIPTION OF THE DRAWINGS

The accompanying drawings constituting a part of the application are included to provide a further understanding of the disclosure. The schematic embodiments and description thereof of the present disclosure are intended to explain the present disclosure, and do not constitute improper restriction to the invention. In the drawings.

DESCRIPTION OF EMBODIMENTS

To make a person skilled in the art better understand the technical solutions of the present disclosure. The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present disclosure.

It should be noted that the terms in the specification, claims, and foregoing drawings of the present disclosure such as "first", "second", and the like are used to differentiate similar entities without necessarily describing specific relationships or sequences. It should be understood that such data may be interchangeable in suitable cases, so that the embodiments of the present invention described herein may be performed in sequences except the sequences shown or described herein. In addition, the terms "comprises", "comprising", "has", "having", "includes", "including", "contains", "containing" or any other variation thereof, are intended to cover a non-exclusive inclusion, such that a process, a method, a system, a product, or an apparatus that comprises, has, includes, contains a series of steps or units does not include only those steps or units but may include other steps or units not expressly listed or inherent to such process, method, product, or apparatus.

Embodiment 1

According to an embodiment of the present invention, a method embodiment for implementing an apparatus embodiment of the present application may be provided. It should be noted that, steps as shown in a flowchart of the accompany drawings may be performed in a computer system such as a group of computer executable instructions; besides, though a logic sequence is shown in the flowchart, in some cases, the shown or described steps may be performed based on a sequence different from that of the present disclosure.

The image processing method as disclosed as following is used to perform quick image processing, which may be implemented by any appropriate computing device having one or more processors and memory. The computing device, used herein, may refer to any appropriate device with certain computing capabilities (e.g., of controlling media data to be placed at a constant speed), such as a personal computer (PC), a work station computer, a hand-held computing device (tablet), a mobile terminal (a mobile phone or a smart phone), a server, a network server, a smart terminal, or any other user-side or server-side computing device. The memory includes storage medium, which may further include memory modules, e.g., Read-Only Memory (ROM), Random Access Memory (RAM), and flash memory modules, and mass storages, e.g., CD-ROM, U-disk, removable hard disk, etc, which are all non-transitory storage medium. The storage medium may store computer programs for implementing various processes, when executed by the processors.

Figure 1:
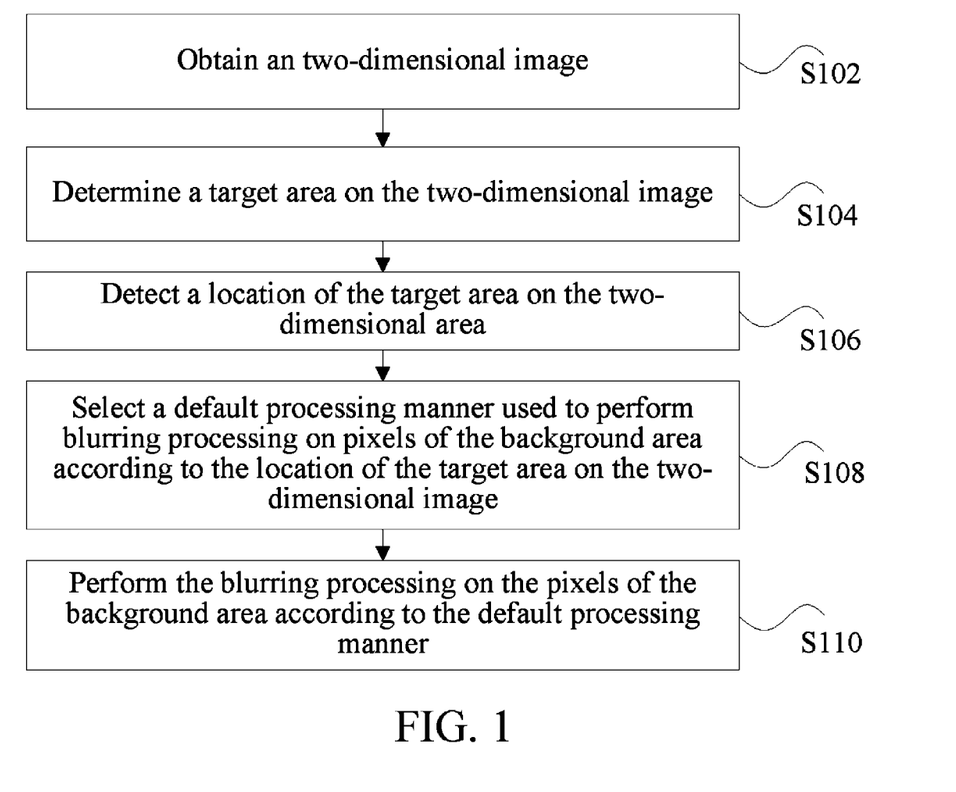
FIG. 1 is a flowchart of an image processing method according to an embodiment of the present invention.

FIG. 1 is a flowchart of an image processing method according to an embodiment of the present invention. As shown in FIG. 1, the method includes the following steps:

Step S102: Obtain a two-dimensional image.

The two-dimensional image may be any two-dimensional image and is not limited to any image taken by any camera, which may be a landscape photograph or a portrait photograph. A two-dimensional image is obtained for performing blurring processing on the two-dimensional image.

Step S104: Determine a target area on the two-dimensional image. The two-dimensional image includes a background area and a target area, and the background area is an area outside of the target area.

After the two-dimensional image is obtained, a target area is determined on the two-dimensional image. The target area may be an object highlighted for simulating a depth of field effect. For example, in a portrait image, portraits need to be highlighted and blurring processing needs to be performed on the area outside of the portraits, so that the area included by the portraits is the target area and the area outside of the portraits is the background area.

Specifically, the target area on the two-dimensional image may be automatically generated, or may be obtained by manual intelligent calibration based on graphcut. In addition, a MASK of the target area is generated. The MASK is a protective layer protecting the target area, so that the blurring processing is not performed on the target area and original pixels of the target area are retained.

Step S106: Detect a location of the target area on the two-dimensional area.

After the target area on the two-dimensional image is determined, the location of the target area on the two-dimensional image is detected, that is, geometric location relationship between the target area and the two-dimensional image is judged. According to a preset coordinate system of a plane of the two-dimensional image, a characteristic coordinate of the target area (for example, a center location coordinate or a boundary coordinate of the target area) may be determined and the location of the target area may be determined. Specifically, a discrepancy factor used to reflect a degree that the center location of the target area deviates from the center location of the two-dimensional image and a discrepancy factor used to reflect a degree that the target area deviates from a boundary of the two-dimensional image may be calculated, and then the location of the target area is judged and determined according to these discrepancy factors.

Step S108: Select, according to the location of the target area on the two-dimensional image, a default processing manner used to perform blurring processing on pixels of the background area.

After the location of the target area on the two-dimensional image is detected, a default processing manner may be selected according to the location. The default processing method is a preset processing method used to perform the blurring processing on pixels of the background area. For example, when the target area nears the center location of the two-dimensional image, a first processing method is selected, which is used to perform gradient blurring processing on pixels of the background area in two directions starting from a boundary of the target area to two boundaries of the two-dimensional image; and when the target area nears a boundary of the two-dimensional image, a second processing method is selected, which is used to perform one-way gradient blurring processing on pixels of the background area.

Step S110: Perform the blurring processing on the pixels of the background area according to the default processing manner.

After the default processing manner is selected, gradient blurring processing on the pixels of the background area may be performed according to the selected processing manner. Specifically, average blurring processing may be performed on the pixels of the background area first, so that blurring degrees of pixels everywhere of the background area are the same, and thus a background average blurring image is obtained; then dynamic calculation parameters for performing the gradient blurring processing on the pixels of the background area are calculated according to the location of the target area; and at last, pixel values of each point on the background area are calculated according to the calculation parameters, the background average blurring image, and original pixels of the background area. Therefore, the gradient blurring processing on the pixels of the background area is implemented.

According to the embodiment of the present invention, by detecting a location of a target area on a two-dimensional image, selecting a default manner used to perform blurring processing on pixels of a background area, and performing the blurring processing on the pixels of the background area according to the default processing manner, a poor simulated depth of field effect caused by adopting the same processing manner for target areas of different locations is avoided, and thus a problem that in the prior art, the blurring processing manner cannot be adjusted accordingly depending on different target areas on an image is solved. Therefore, for different target areas, corresponding blurring processing manners thereof are adopted.

In the embodiment of the present invention, a corresponding manner is selected according to a location of a target area to perform blurring processing on pixels of a background area, and the foregoing manner may be adopted to perform the blurring processing on any two-dimensional image. Therefore, compared with the pinhole imaging module based filtering solution in the prior art, the solution of the embodiment applies to a wider range of application scenarios. In addition, a target area may be any area calibrated on a two-dimensional image and is not limited to portraits. Therefore, compared with the face recognition based solution, the solution of the embodiment of the present invention applies to a wider range of application scenarios.

Figure 2:
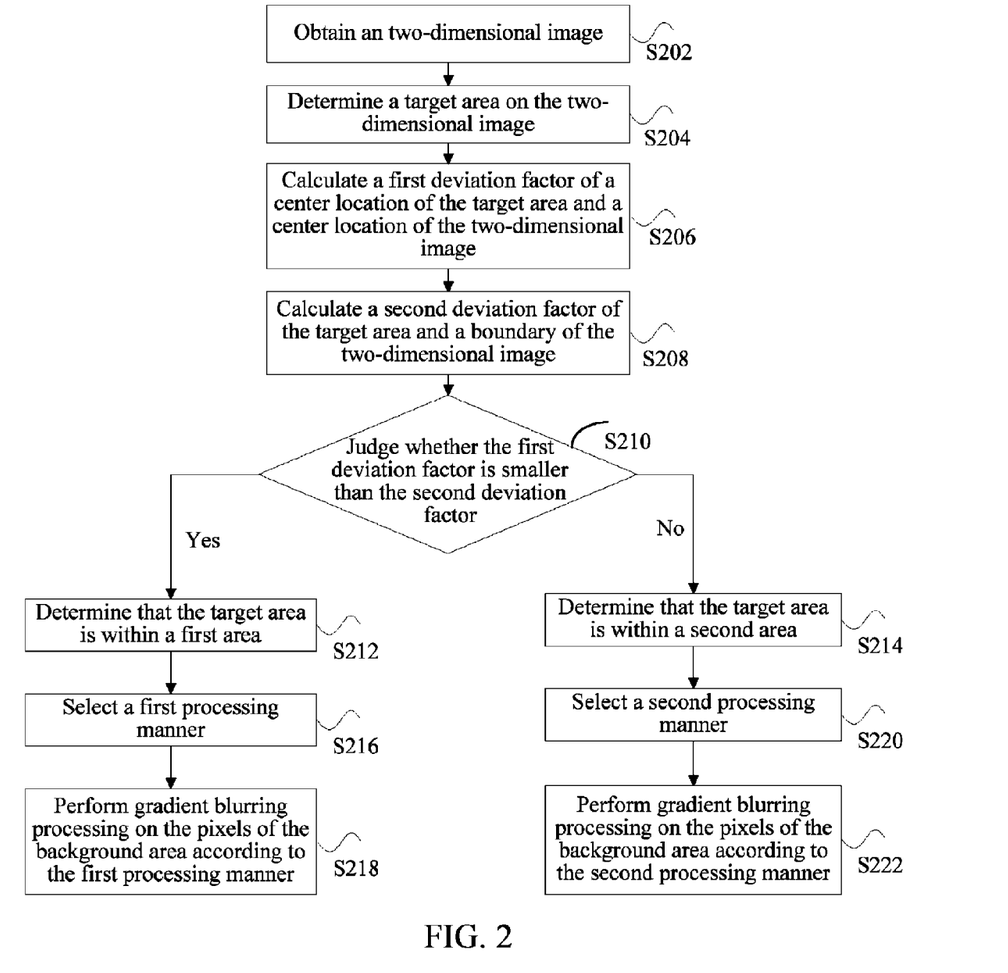
FIG. 2 is a flowchart of a preferred image processing method according to an embodiment of the present invention.

FIG. 2 is a flowchart of a preferred image processing method according to an embodiment of the present invention. The image processing method of the embodiment may be a preferred implementation manner of the image processing method of the foregoing embodiment. As shown in FIG. 2, the image processing method includes the following steps:

Step S202 and step S204 are the same as step S102 and step S104 shown in FIG. 1 in sequence, which is not repeated again herein.

Step S206: Calculate a first deviation factor of a center location of the target area and a center location of the two-dimensional image. The first deviation factor is used to reflect a degree that the center location of the target area deviates from the center location of the two-dimensional image.

The center location of the target area and the center location of the two-dimensional image may be determined first, then a first deviation factor is calculated according to the two center locations, and the location relationship between the center location of the target area and the center location of the two-dimensional image may be judged by using the first deviation factor.

Step S208: Calculate a second deviation factor of the target area and a boundary of the two-dimensional image. The second deviation factor is used to reflect a degree that the target area deviates from a boundary of the two-dimensional image.

A boundary of the target area and a boundary of the two-dimensional image may be determined first, wherein the boundary of the two-dimensional image is the boundary corresponding to the boundary of the target area, and then a second deviation factor is calculated according to the location relationship between the two boundaries.

Step S210: Judge whether the first deviation factor is smaller than the second deviation factor.

Step S212: Determine that the target area is within a first area when it is judged that the first deviation factor is smaller than the second deviation factor. The first area is an area towards the center location of the two-dimensional image.

A first area may be an area nearing the center location of the two-dimensional image and the distance between the area and the center location of the two-dimensional image is a first preset distance.

Step S214: Determine that the target area is within a second area when it is judged that the first deviation factor is equal to or larger than the second deviation factor. The second area is an area towards a boundary of the two-dimensional image.

A second area may be an area nearing a boundary of the two-dimensional image and the distance between the area and the boundary of the two-dimensional image is a second preset distance.

Figure 3:
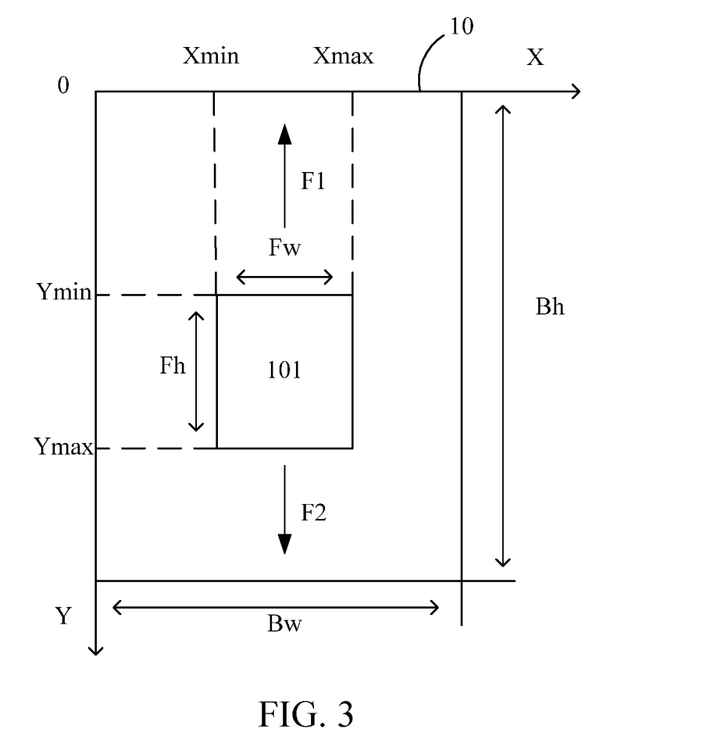
FIG. 3 is a schematic diagram of an image processing effect according to an embodiment of the present invention.

Specifically, a coordinate system may be set up on a plane where the two-dimensional image is located. As shown in FIG. 3, a target area 101 is calibrated in a two-dimensional image 10, an origin 0 of the coordinate system is located in the upper left corner of the two-dimensional image 10, the Y axis positive direction is along the upper left corner to the lower left corner of the image, and the X axis positive direction is along the upper left corner to the upper right corner of the image. Boundaries of the target area are represented as Xmin (minimum value in the X axis direction), Xmax (maximum value in the X axis direction), Ymin (minimum value in the Y axis direction), and Ymax (maximum value in the Y axis direction) respectively. Width and length of an input two-dimensional image are represented as Bw and Bh respectively. Width and length of the target area are represented as Fw and Fh respectively. Calculation results are represented as parameters R_up_inner (gradient blurring starting boundary in the Y axis positive direction), R_up_outer (gradient blurring ending boundary in the Y axis positive direction), R_down_inner (gradient blurring starting boundary in the Y axis negative direction), and R_down_outer (gradient blurring ending boundary in the Y axis negative direction).

Firstly, a location of the center point of the target area on the Y axis may be calculated by using Yc=Ymin+Fh/2, and a location of the center point of the two-dimensional image on the Y axis may be calculated by using Bc=Bh/2.

A deviation factor of the center location of the target area and the center location of the two-dimensional image along the Y axis positive direction is calculated by using offset_center=abs(Yc−Bc)/Bh, wherein abs indicates an absolute value.

A deviation factor of the target area and the boundary of the two-dimensional image along the Y axis positive direction is calculated by using offset_y=(Bh−Ymax)/Bh.

Values of offset_center and offset_y are compared to determine whether the target area towards the center of the two-dimensional image or towards a boundary of the two-dimensional image If the value of offset_center is smaller than that of offset_y, it is determined that the target area towards the center of the two-dimensional image.

If the value of offset_center is larger than or equal to that of offset_y, it is determined that the target area towards a boundary of the two-dimensional image.

It should be noted that the manners of calculating deviation factors in the embodiment of the present invention are not limited to calculation manners in examples. For example, the coordinate system may be a coordinate system in other forms.

According to the embodiment of the present invention, the first deviation factor and the second deviation factor are obtained by calculation, and the location of the target area on the two-dimensional area is determined by using the first deviation factor and the second deviation factor, so that the location detection of the target area is more accurate and the precision of the location detection is improved.

In the embodiment of the present invention, the default processing manner includes a first processing manner and a second processing manner, as shown in FIG. 2, selecting, according to the location of the target area on the two-dimensional image, a default processing manner used to perform blurring processing on pixels of the background comprises step S216: select a first processing manner after determining that the target area is within the first area. The first processing manner is used to perform gradient blurring processing on the pixels of the background area in a first direction, wherein the first direction is a direction from a boundary of the target area to a boundary of the two-dimensional image corresponding to the boundary of the target area. Performing the blurring processing on the pixels of the background area according to the default processing manner comprises step S218: perform gradient blurring processing on the pixels of the background area according to the first processing manner.

Specifically, in the coordinate system of the foregoing example, the first processing manner may be performing two-way gradient blurring processing on the background area along positive and negative directions of the Y axis, such as direction F1 and direction F2 shown in FIG. 3. Boundaries of the blurring processing are R_up_inner=Fh*a, R_up_outer=R_up_inner+Fh*b, R_down_inner=Fh*c, and R_down_outer=R_down_inner+Fh*d in sequence, wherein a, b, c, and d are preset parameters, and their values may be adjusted according to requirements, for example, the values of a, b, c, and d are 0.3, 0.5, 0.1, and 0.5 in sequence. Of course, the first processing manner may also be performing two-way gradient blurring processing on the background area along positive and negative directions of the X axis, or performing gradient blurring processing on the background area along positive and negative directions of the X axis and positive and negative directions of the Y axis respectively, and the principles thereof are the same as those of performing the two-way gradient blurring processing on the background area along positive and negative directions of the Y axis, which are not repeated again herein.

Optionally, as shown in FIG. 2, selecting a default processing manner used to perform blurring processing on pixels of the background area according to the location of the target area on the two-dimensional area may comprise step S220: select a second processing manner after determining that the target area is within the second area. The second processing manner is used to perform gradient blurring processing on the pixels of the background area in a second direction, wherein the second direction is a direction from a boundary nearest to the target area to a boundary farthest to the target area on the two-dimensional image. Performing the blurring processing on the pixels of the background area according to the default processing manner comprises step S222: perform gradient blurring processing on the pixels of the background area according to the second processing manner.

Specifically, in the coordinate system of the foregoing example, the second processing manner may be performing one-way gradient blurring on the background area along the Y axis positive direction, wherein boundaries of the blurring processing are R_up_inner=Fh*a, R_up_outer=R_up_inner+Fh*b, R_down_inner=0, and R_down_outer=0. Of course, the first processing manner may also be performing one-way gradient blurring processing on the background area along the Y axis negative direction, or performing one-way gradient blurring processing on the background area along the X axis positive direction or X axis negative direction, or performing one-way gradient blurring processing on the background area on the X axis or Y axis respectively, and the principles thereof are the same as those of performing the one-way gradient blurring on the background area along the Y axis positive direction, which are not repeated herein again.

Preferably, in the embodiment of the present invention, before the location of the target area on the two-dimensional image is detected, the image processing method further comprises: calculating a width ratio between width of the target area and width of the two-dimensional image; calculating a length ratio between length of the target area and length of the two-dimensional image; judging whether the width ratio exceeds a first ratio threshold and judging whether the length ratio exceeds a second ratio threshold, and if the width ratio exceeds the first ratio threshold and the length ratio exceeds the second ratio threshold, performing gradient blurring processing on the pixels of the background area in a default direction, wherein the default direction is a preset direction used for performing the gradient blurring processing on the pixels of the background area.

The first ratio threshold and the second ratio threshold may be adjusted and set according to requirements, for example, 0.7 and 0.8. The first ratio threshold and the second ratio threshold may be used to judge the ratio relationship between area of the target area and area of the two-dimensional image area.

Specifically, in the coordinate of the foregoing embodiment, a length ratio between length of the target area and length of the two-dimensional image along the Y axis direction is calculated by using Yr=Fh/Bh, and a width ratio between width of the target area and width of the two-dimensional image along the X axis direction is calculated by using Xr=Fw/Bw.

Whether the width ratio exceeds a first ratio threshold and whether the length ratio exceeds a second ratio threshold are judged. For example, when the first ratio threshold is 0.8 and the second threshold is 0.7, if Xr>0.8 and Yr>0.7, that is, the width ratio and length ratio of the target area and the two-dimensional image both exceed threshold values, the gradient blurring processing on the background area is performed in the default direction. For example, rapid gradient blurring processing on the background area should be performed along the Y axis positive direction, and boundaries of the blurring processing are R_up_inner=Fw*(1−Fh/Ymax), R_up_outer=R_up_inner*e, R_down_inner=0, and R_down_outer=0, wherein e is a preset parameter and may be set according to requirements, for example, setting e to 1.1.

According to the embodiment of the present invention, when area of the target area is judged to be relatively large, area of the background area to be processed is relatively small, so that rapid gradient processing on the background area may be performed in the default direction, and therefore, in such a case, the speed of image processing is improved.

Preferably, in the embodiment of the present invention, performing gradient blurring processing on the pixels of the background area comprises: determining starting boundaries and ending boundaries for performing the blurring processing on the pixels of the background area; and performing the gradient blurring processing on the pixels of the background area between the starting boundaries and the ending boundaries, wherein a blurring degree of pixels at a starting boundary is less than a blurring degree of pixels at an ending boundary.

Starting boundaries and ending boundaries such as R_up_inner (gradient blurring starting boundary in the Y axis positive direction), R_up_outer (gradient blurring ending boundary in the Y axis positive direction), R_down_inner (gradient blurring starting boundary in the Y axis negative direction), and R_down_outer (gradient blurring ending boundary in the Y axis negative direction) described above are determined. The area needs to be blurred is the background area between a starting boundary in the Y axis positive direction and an ending boundary in the Y axis positive direction, and the background area between a starting boundary in the Y axis negative direction and an ending boundary in the Y axis negative direction. Specifically, after the average blurring processing is performed on the background area, the gradient blurring processing may be performed on pixels of the background area between a starting boundary in the Y axis positive direction and an ending boundary in the Y axis positive direction, and pixels of the background area between a starting boundary in the Y axis negative direction and an ending boundary in the Y axis negative direction. Pixels of other background areas adopt the pixel obtained after the average blurring processing.

Preferably, in the embodiment of the present invention, after the target area on the two-dimensional image is determined, the image processing method further comprises: performing average blurring processing on the pixels of the background to obtain a background average blurring image, wherein the average blurring processing is used to make pixels everywhere of the background average blurring image have the same blurring degree. Performing the blurring processing on the pixels of the background area according to the default processing manner comprises: obtaining the pixels of the background and pixels on the background average blurring image; determining calculation parameters for performing the gradient blurring processing on the pixels of the background area by using the default processing manner; and calculating pixel values obtained after the gradient blurring processing on the background area according to the calculation parameters, the pixels of the background area, and pixel values on the background average blurring image.

Average blurring processing may adopt a processing manner such as Gaussian blur to process the pixels of the background area to make pixels everywhere of the background area have the same blurring degree, so as to obtain a background average blurring image.

In the embodiment of the present invention, for pixels within the background area, calculation parameters thereof are calculated one by one, and the background area and the background average blurring image are fused by using the calculation parameters. As a result, a depth of field effect image is obtained. In the foregoing coordinate system, (x,y) indicates a coordinate of each point of the background area, $D(x,y)$ indicates a target pixel of the point after processing, $Bg(x,y)$ indicates a background average blurring pixel of the point, and $Fg(x,y)$ indicates an original pixel of the background area of the point. The calculation method is as follows:

$$D(x,y)=Bg(x,y), y<=R\_up\_outer, y>=R\_down\_outer; \quad\quad \text{a)}$$

$$D(x,y)=Bg(x,y)*alpha+Fg(x,y)*(1-alpha),$$
$$R\_up\_inner<y<Ymax, alpha=(Ymax-y)/(Ymax-R\_up\_inner); \quad\quad \text{b)}$$

$$D(x,y)=Bg(x,y)*(1-alpha)+Fg(x,y)*alpha,$$
$$Ymax<y<R\_down\_inner, alpha=(R\_down\_inner-y)/(R\_down\_inner-Ymax); \quad\quad \text{c)}$$

$$D(x,y)=Fg(x,y), R\_up\_inner<=y<=R\_down\_inner; \quad\quad \text{d)}$$

therefore, pixels of each point are calculated and gradient processing on the pixels of the background area is implemented.

Figure 4:
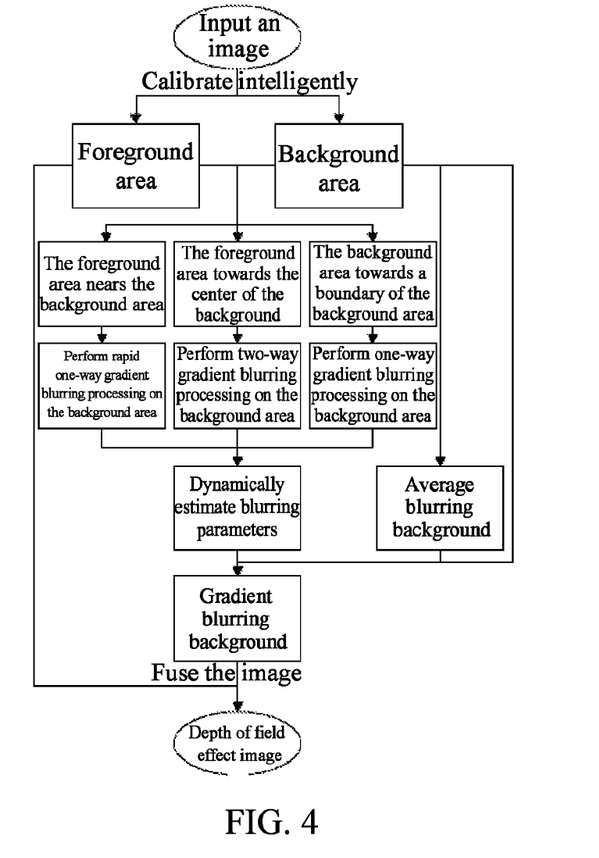
FIG. 4 is a flowchart of another preferred image processing method according to an embodiment of the present invention.

FIG. 4 is a flowchart of another preferred image processing method according to an embodiment of the present invention. As shown in FIG. 4, in an image processing method, an image is input first, that is, a two-dimensional image is obtained. The image is intelligently calibrated to determine a foreground area and a background area, wherein the foreground area refers to the target area of the embodiment of the present invention. A location of the foreground area is detected, and if it is determined that the foreground area nears the background area, that is, the size of the target area is similar to the size of the original two-dimensional image, rapid one-way gradient blurring processing is performed on the background area; if it is determined that the foreground area towards the center of the background, that is, the target area towards the center of the two-dimensional image, two-way gradient blurring processing is performed on the background area; and if it is determined that the background area towards a boundary of the background area, that is, the target area towards a boundary of the two-dimensional image, one-way gradient blurring processing is performed on the background area. Blurring parameters are dynamically estimated, that is, parameters for performing gradient blurring processing on the image are calculated, and by using the parameters, corresponding processing is performed on an average blurring background obtained after average blurring processing on the background area to obtain a gradient blurring background. Then image fusion is performed on the gradient blurring background and the foreground area to obtain a depth of field effect image.

It should be noted that, for brevity, the foregoing method embodiments are described as a series of action combinations; however, a person skilled in the art should understand that the present disclosure is not limited to the described action sequence, because according to the present disclosure, some steps may be performed in another sequence or performed simultaneously. Moreover, a person skilled in the art should also understand that the embodiments described in the specification all belong to preferred embodiments, and the involved actions and modules are not necessarily required by the present disclosure.

Through the foregoing description of the implementation manners, a person skilled in the art may clearly understand that the image processing method according to the foregoing embodiment may be implemented by software and necessary general-purpose hardware platform, or hardware; however, in most cases, the former is a better implementation manner. Based on such an understanding, the technical solutions of the present disclosure essentially, or the part contributing to the prior art may be implemented in a form of a software product. The computer software product is stored in a storage medium (such as a ROM/RAM, a magnetic disk, or an optical disc.), and includes several instructions for instructing a terminal device (which may be a mobile phone, a computer, a server, or a network device) to perform the methods described in each embodiment of the present invention.

Embodiment 2

According to the embodiment of the present invention, an image processing apparatus for implementing the foregoing image processing method is also provided. The image processing apparatus mainly configured to perform the image processing method according to the foregoing content of the embodiment of the present invention. The following describes the image processing apparatus according to the embodiment of the present invention.

Figure 5:
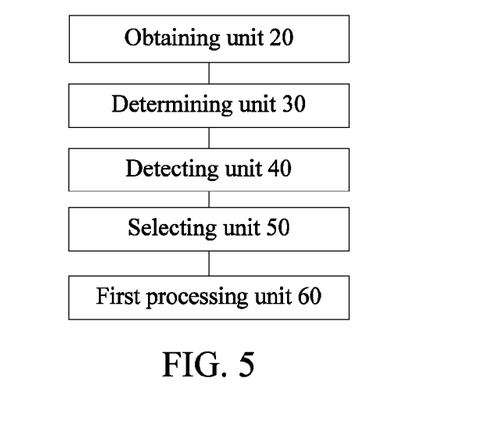
FIG. 5 is a schematic diagram of an image processing apparatus according to an embodiment of the present invention.

FIG. 5 is a schematic diagram of an image processing apparatus according to an embodiment of the present invention. As shown in FIG. 5, the image processing apparatus comprises: an obtaining unit 20, a determining unit 30, a detecting unit 40, a selecting unit 50, and a first processing unit 60.

An obtaining unit 20 is configured to obtain a two-dimensional image.

The two-dimensional image may be any two-dimensional image and is not limited to any image taken by any camera, which may be a landscape photograph or a portrait photograph. A two-dimensional image is obtained for performing blurring processing on the two-dimensional image.

A determining unit 30 is configured to determine a target area on the two-dimensional image. The two-dimensional image includes a background area and a target area, and the background area is an area outside of the target area.

After the two-dimensional image is obtained, a target area is determined on the two-dimensional image. The target area may be an object highlighted for simulating a depth of field effect. For example, in a portrait image, portraits need to be highlighted and blurring processing needs to be performed on the area outside of the portraits, so that the area included by the portraits is the target area and the area outside of the portraits is the background area.

Specifically, the target area on the two-dimensional image may be automatically generated, or may be obtained by manual intelligent calibration based on graphcut. In addition, a MASK of the target area is generated. The MASK is a protective layer protecting the target area, so that the blurring processing is not performed on the target area and original pixels of the target area are retained.

A detecting unit 40 is configured to detecting a location of the target area on the two-dimensional image.

After the target area on the two-dimensional image is determined, the location of the target area on the two-dimensional image is detected, that is, geometric location relationship between the target area and the two-dimensional image is judged. According to a preset coordinate system of a plane of the two-dimensional image, a characteristic coordinate of the target area (for example, a center location coordinate or a boundary coordinate of the target area) may be determined and the location of the target area may be determined. Specifically, a discrepancy factor used to reflect a degree that the center location of the target area deviates from the center location of the two-dimensional image and a discrepancy factor used to reflect a degree that the target area deviates from a boundary of the two-dimensional image may be calculated, and then the location of the target area is judged and determined according to these discrepancy factors.

A selecting unit 50 is configured to select, according to the location of the target area on the two-dimensional image, a default processing manner used to perform blurring processing on pixels of the background area.

After the location of the target area on the two-dimensional image is detected, a default processing manner may be selected according to the location. The default processing method is a preset processing method used to perform the blurring processing on pixels of the background area. For example, when the target area nears the center location of the two-dimensional image, a first processing method is selected, which is used to perform gradient blurring processing on pixels of the background area in two directions starting from a boundary of the target area to two boundaries of the two-dimensional image; and when the target area nears a boundary of the two-dimensional image, a second processing method is selected, which is used to perform one-way gradient blurring processing on pixels of the background area.

A first processing unit 60 is configured to perform blurring processing on the pixels of the background area according to the default processing manner.

After the default processing manner is selected, gradient blurring processing on the pixels of the background area is performed according to the selected processing manner. Specifically, average blurring processing may be performed on the pixels of the background area first, so that blurring degrees of pixels everywhere of the background area are the same, and thus a background average blurring image is obtained; then dynamic calculation parameters for processing the pixels of the background area are calculated according to the location of the target area; and at last, pixels of each point on the background area are calculated according to the calculation parameters, the background average blurring image, and original pixels of the background area. Therefore, the gradient blurring processing on the pixels of the background area is implemented.

According to the embodiment of the present invention, by detecting a location of a target area on a two-dimensional image, selecting a default manner used to perform blurring processing on pixels of a background area, and performing the blurring processing on the pixels of the background area according to the default processing manner, a poor simulated depth of field effect caused by adopting the same processing manner for target areas of different locations is avoided, and thus a problem that in the prior art, the blurring processing manner cannot be adjusted accordingly depending on different target areas on an image is solved. Therefore, for different target areas, corresponding blurring processing manners thereof are adopted.

In the embodiment of the present invention, a corresponding manner is selected according to a location of a target area to perform blurring processing on pixels of a background area, and the foregoing manner may be adopted to perform the blurring processing on any two-dimensional image. Therefore, compared with the pinhole imaging module based filtering solution in the prior art, the solution of the embodiment applies to a wider range of application scenarios. In addition, a target area may be any area calibrated on a two-dimensional image and is not limited to portraits. Therefore, compared with the face recognition based solution, the solution of the embodiment of the present invention applies to a wider range of application scenarios.

Figure 6:
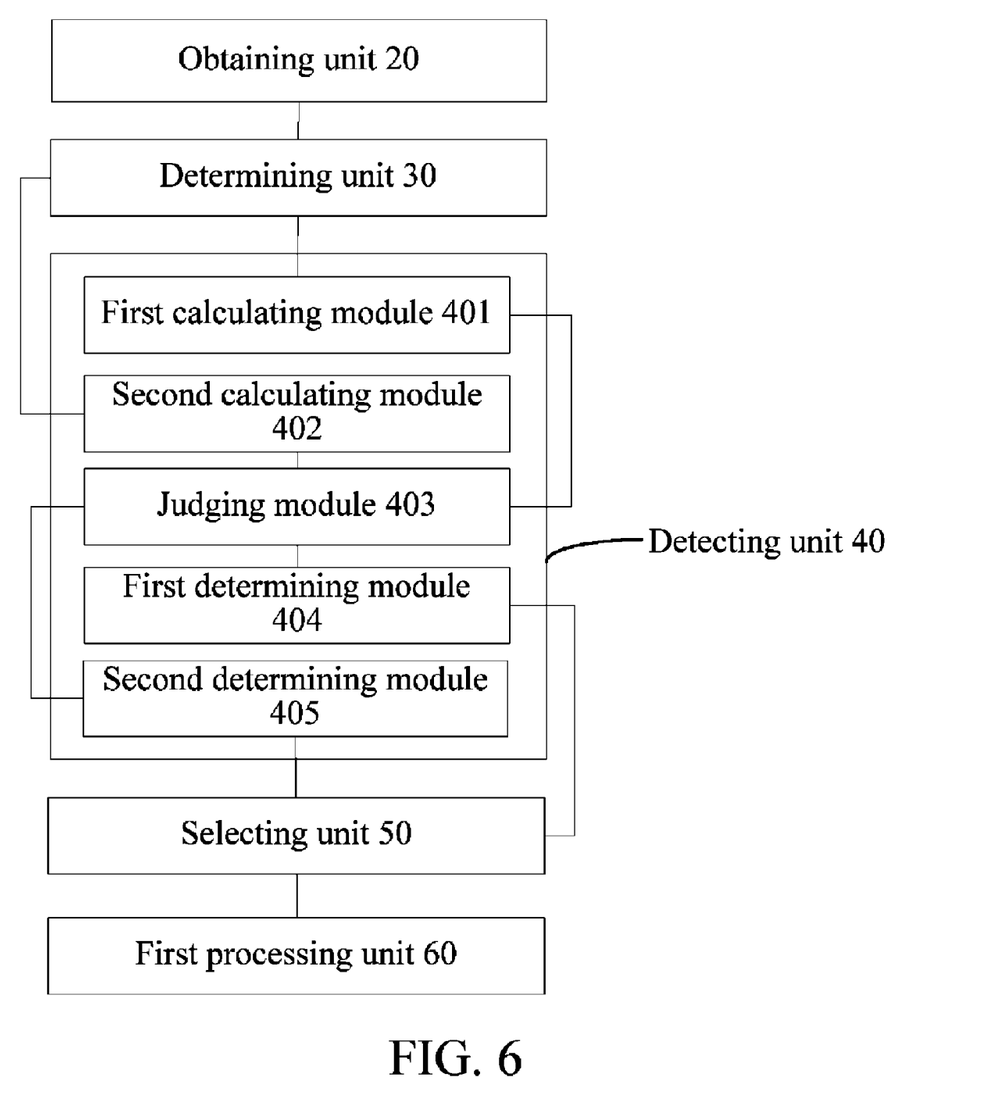
FIG. 6 is a schematic diagram of a preferred image processing apparatus according to an embodiment of the present invention.

FIG. 6 is a schematic diagram of a preferred image processing apparatus according to an embodiment of the present invention. The image processing apparatus of the embodiment may be a preferred implementation manner of the image processing apparatus of the foregoing embodiment. The image processing apparatus comprises: an obtaining unit 20, a determining unit 30, a detecting unit 40, a selecting unit 50, and a first processing unit 60, wherein the detecting unit 40 comprises: a first calculating module 401, a second calculating module 402, a judging module 403, a first determining module 404, and a second determining module 405.

The first calculating module 401 is configured to calculate a first deviation factor of a center location of the target area and a center location of the two-dimensional image, wherein the first deviation factor is used to reflect a degree that the center location of the target area deviates from the center location of the two-dimensional image.

The center location of the target area and the center location of the two-dimensional image may be determined first, then a first deviation factor is calculated according to the two center locations, and the location relationship between the center location of the target area and the center location of the two-dimensional image may be judged by using the first deviation factor.

The second calculating module 402 is configured to calculate a second deviation factor of the target area and a boundary of the two-dimensional image, wherein the second deviation factor is used to reflect a degree that the target area deviates from a boundary of the two-dimensional image.

A boundary of the target area and a boundary of the two-dimensional image may be determined first, wherein the boundary of the two-dimensional image is the boundary corresponding to the boundary of the target area, and then a second deviation factor is calculated according to the location relationship between the two boundaries.

The judging module 403 is configured to judge whether the first deviation factor is smaller than the second deviation factor.

The first determining module 404 is configured to, when it is judged that the first deviation factor is smaller than the second deviation factor, determine that the target area is within a first area, wherein the first area is an area towards the center location of the two-dimensional image.

A first area may be an area nearing the center location of the two-dimensional image and the distance between the area and the center location of the two-dimensional image is a first preset distance.

The second determining module 405 is configured to, when it is judged that the first deviation factor is equal to or larger than the second deviation factor, determine that the target area is within a second area, wherein the second area is an area towards a boundary of the two-dimensional image.

A second area may be an area nearing a boundary of the two-dimensional image and the distance between the area and the boundary of the two-dimensional image is a second preset distance.

Specifically, a coordinate system may be set up on a plane where the two-dimensional image is located. As shown in FIG. 3, a target area 101 is calibrated in a two-dimensional image 10, an origin 0 of the coordinate system is located in the upper left corner of the two-dimensional image 10, the Y axis positive direction is along the upper left corner to the lower left corner of the image, and the X axis positive direction is along the upper left corner to the upper right corner of the image. Boundaries of the target area are represented as Xmin (minimum value in the X axis direction), Xmax (maximum value in the X axis direction), Ymin (minimum value in the Y axis direction), and Ymax (maximum value in the Y axis direction) respectively. Width and length of an input two-dimensional image are represented as Bw and Bh respectively. Width and length of the target area are represented as Fw and Fh respectively. Calculation results are represented as parameters R_up_inner (gradient blurring starting boundary in the Y axis positive direction), R_up_outer (gradient blurring ending boundary in the Y axis positive direction), R_down_inner (gradient blurring starting boundary in the Y axis negative direction), and R_down_outer (gradient blurring ending boundary in the Y axis negative direction).

Firstly, a location of the center point of the target area on the Y axis may be calculated by using Yc=Ymin+Fh/2, and a location of the center point of the two-dimensional image on the Y axis may be calculated by using Bc=Bh/2.

A deviation factor of the center location of the target area and the center location of the two-dimensional image along the Y axis positive direction is calculated by using offset_center=abs(Yc−Bc)/Bh, wherein abs indicates an absolute value.

A deviation factor of the target area and the boundary of the two-dimensional image along the Y axis positive direction is calculated by using offset_y=(Bh−Ymax)/Bh.

Values of offset_center and offset_y are compared to determine whether the target area towards the center of the two-dimensional image or towards a boundary of the two-dimensional image If the value of offset_center is smaller than that of offset_y, it is determined that the target area towards the center of the two-dimensional image.

If the value of offset_center is larger than or equal to that of offset_y, it is determined that the target area towards a boundary of the two-dimensional image.

It should be noted that the manners of calculating deviation factors in the embodiment of the present invention are not limited to calculation manners in examples. For example, the coordinate system may be a coordinate system in other forms.

According to the embodiment of the present invention, the first deviation factor and the second deviation factor are obtained by calculation, and the location of the target area on the two-dimensional area is determined by using the first deviation factor and the second deviation factor, so that the location detection of the target area is more accurate and the precision of the location detection is improved.

Figure 7:
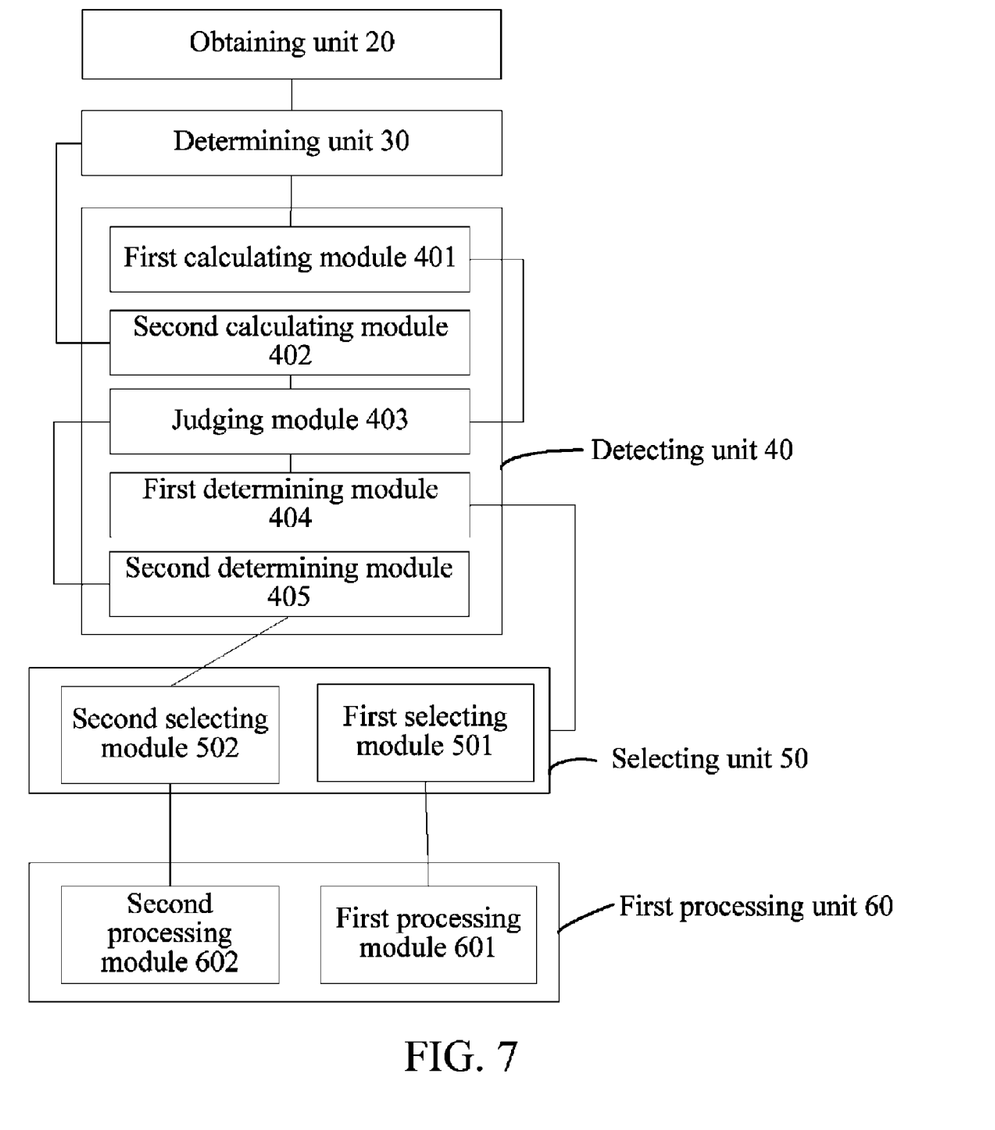
FIG. 7 is a schematic diagram of another preferred image processing apparatus according to an embodiment of the present invention.

FIG. 7 is a schematic diagram of another preferred image processing apparatus according to an embodiment of the present invention. The image processing apparatus of the embodiment may be a preferred implementation manner of the image processing apparatus of the foregoing embodiment. The image processing apparatus comprises: an obtaining unit 20, a determining unit 30, a detecting unit 40, a selecting unit 50, and a first processing unit 60, wherein the detecting unit 40 comprises: a first calculating module 401, a second calculating module 402, a judging module 403, a first determining module 404, and a second determining module 405. The selecting unit 50 comprises a first selecting module 501. The first processing unit 60 comprises a first processing module 601.

The first selecting module 501 is configured to select a first processing manner after determining that the target area is within a first area. The first processing manner is used to perform gradient blurring processing on the pixels of the background area in a first direction, wherein the first direction is a direction from a boundary of the target area to a boundary of the two-dimensional image corresponding to the boundary of the target area. The first processing module 601 is configured to perform gradient blurring processing on the pixels of the background area according to the first processing manner.

Specifically, in the coordinate system of the foregoing example, the first processing manner may be performing two-way gradient blurring processing on the background area along positive and negative directions of the Y axis, such as direction F1 and direction F2 shown in FIG. 3. Boundaries of the blurring processing are R_up_inner= Fh*a, R_up_outer=R_up_inner+Fh*b, R_down_inner= Fh*c, and R_down_outer=R_down_inner+Fh*d in sequence, wherein a, b, c, and d are preset parameters, and their values may be adjusted according to requirements, for example, the values of a, b, c, and d are 0.3, 0.5, 0.1, and 0.5 in sequence. Of course, the first processing manner may also be performing two-way gradient blurring processing on the background area along positive and negative directions of the X axis, or performing gradient blurring processing on the background area along positive and negative directions of the X axis and positive and negative directions of the Y axis respectively, and the principles thereof are the same as those of performing the two-way gradient blurring processing on the background area along positive and negative directions of the Y axis, which are not repeated again herein.

Optionally, as shown in FIG. 7, the selecting unit 50 comprises a second selecting module 502. The second selecting module 502 is configured to select a second processing manner after determining that the target area is within a second area. The second processing manner is used to perform gradient blurring processing on the pixels of the background area in a second direction, wherein the second direction is a direction from a boundary nearest to the target area to a boundary farthest to the target area on the two-dimensional image. The first processing unit 60 comprises a second processing module 602, and the second processing module 602 is configured to perform the gradient blurring processing on the pixels of the background area according to the second processing manner.

Specifically, in the coordinate system of the foregoing example, the second processing manner may be performing one-way gradient blurring on the background area along the Y axis positive direction, wherein boundaries of the blurring processing are R_up_inner=Fh*a, R_up_outer=R_up_ inner+Fh*b, R_down_inner=0, and R_down_outer=0. Of course, the first processing manner may also be performing one-way gradient blurring processing on the background area along the Y axis negative direction, or performing one-way gradient blurring processing on the background area along the X axis positive direction or X axis negative direction, or performing one-way gradient blurring processing on the background area on the X axis or Y axis respectively, and the principles thereof are the same as those of performing the one-way gradient blurring on the background area along the Y axis positive direction, which are not repeated herein again.

Preferably, the image processing apparatus further comprises: a first calculating unit, configured to calculate a width ratio between width of the target area and width of the two-dimensional image before the location of the target area on the two-dimensional image is detected; a second calculating unit, configured to calculate a length ratio between length of the target area and length of the two-dimensional image; and a judging unit, configured to judge whether the width ratio exceeds a first ratio threshold and whether the length ratio exceeds a second ratio threshold, and the first processing unit is also configured to, if the width ratio exceeds the first ratio threshold and the length ratio exceeds the second ratio threshold, perform gradient blurring processing on the pixels of the background area in a default direction, wherein the default direction is a preset direction used for performing the gradient blurring processing on the pixels of the background area.

The first ratio threshold and the second ratio threshold may be adjusted and set according to requirements, for example, 0.7 and 0.8. The first ratio threshold and the second ratio threshold may be used to judge the ratio relationship between area of the target area and area of the two-dimensional image area.

Specifically, in the coordinate of the foregoing embodiment, a length ratio between length of the target area and length of the two-dimensional image along the Y axis direction is calculated by using Yr=Fh/Bh, and a width ratio between width of the target area and width of the two-dimensional image along the X axis direction is calculated by using Xr=Fw/Bw.

Whether the width ratio exceeds a first ratio threshold and whether the length ratio exceeds a second ratio threshold are judged. For example, when the first ratio threshold is 0.8 and the second threshold is 0.7, if Xr>0.8 and Yr>0.7, that is, the width ratio and length ratio of the target area and the two-dimensional image both exceed threshold values, the gradient blurring processing on the background area is performed in the default direction. For example, rapid gradient blurring processing on the background area should be performed along the Y axis positive direction, and boundaries of the blurring processing are R_up_inner=Fw* (1−Fh/Ymax), R_up_outer=R_up_inner*e, R_down_inner=0, and R_down_outer=0, wherein e is a preset parameter and may be set according to requirements, for example, setting e to 1.1.

According to the embodiment of the present invention, when area of the target area is judged to be relatively large, area of the background area to be processed is relatively small, so that rapid gradient processing on the background area may be performed in the default direction, and therefore, in such a case, the speed of image processing is improved.

Preferably, the following submodules are adopted to perform the gradient blurring processing on the background area: a determining submodule, configured to determine starting boundaries and ending boundaries for performing the blurring processing on the pixels of the background area; and a processing submodule, configured to perform the gradient blurring processing on the pixels of the background area between the starting boundaries and the ending boundaries, wherein a blurring degree of pixels at a starting boundary is less than a blurring degree of pixels at an ending boundary.

Starting boundaries and ending boundaries such as R_up_inner (gradient blurring starting boundary in the Y axis positive direction), R_up_outer (gradient blurring ending boundary in the Y axis positive direction), R_down_inner (gradient blurring starting boundary in the Y axis negative direction), and R_down_outer (gradient blurring ending boundary in the Y axis negative direction) described above are determined. The area needs to be blurred is the background area between a starting boundary in the Y axis positive direction and an ending boundary in the Y axis positive direction, and the background area between a starting boundary in the Y axis negative direction and an ending boundary in the Y axis negative direction. Specifically, after the average blurring processing is performed on the background area, the gradient blurring processing may be performed on pixels of the background area between a starting boundary in the Y axis positive direction and an ending boundary in the Y axis positive direction, and pixels of the background area between a starting boundary in the Y axis negative direction and an ending boundary in the Y axis negative direction. Pixels of other background areas adopt the pixel obtained after the average blurring processing.

Preferably, the image processing apparatus further comprises: a second processing unit, configured to, after the target area on the two-dimensional image is determined, perform average blurring processing on pixels of the background to obtain a background average blurring image, wherein the average blurring processing is used to make pixels everywhere of the background average blurring image have the same blurring degree. The first processing unit comprises: an obtaining module, configured to obtain pixels of the background area and pixels on the background average blurring image; a third determining module, configured to determine calculation parameters for performing the gradient blurring processing on the pixels of the background area by using the default processing manner; and a third calculating unit, configured to calculate pixels obtained after the gradient blurring processing on the background area according to the calculation parameters, the pixels of the background area, and the pixels on the background average blurring image.

Average blurring processing may adopt a processing manner such as Gaussian blur to process the pixels of the background area to make pixels everywhere of the background area have the same blurring degree, so as to obtain a background average blurring image.

In the embodiment of the present invention, for pixels within the background area, calculation parameters thereof are calculated one by one, and the background area and the background average blurring image are fused by using the calculation parameters. As a result, a depth of field effect image is obtained. In the foregoing coordinate system, (x,y) indicates a coordinate of each point of the background area, $D(x,y)$ indicates a target pixel of the point after processing, $Bg(x,y)$ indicates a background average blurring pixel of the point, and $Fg(x,y)$ indicates an original pixel of the background area of the point. The calculation method is as follows:

$D(x,y)=Bg(x,y), y<=R\_up\_outer or y>=R\_down\_outer;$     a)

$D(x,y)=Bg(x,y)*alpha+Fg(x,y)*(1-alpha),$
$R\_up\_inner<y<Ymax, alpha=(Ymax-y)/(Ymax-R\_up\_inner);$     b)

$D(x,y)=Bg(x,y)*(1-alpha)+Fg(x,y)*alpha,$
$Ymax<y<R\_down\_inner, alpha=(R\_down\_inner-y)/(R\_down\_inner-Ymax);$     c)

$D(x,y)=Fg(x,y), R\_up\_inner<=y<=R\_down\_inner;$     d)

therefore, pixels of each point are calculated and gradient processing on the pixels of the background area is implemented.

The sequence numbers of the foregoing embodiments of the present invention are merely for the convenience of description, and do not imply the preference among the embodiments.

In the foregoing embodiments of the present invention, the description of each embodiment has its own focus. For a part that is not described in detail in a certain embodiment, reference may be made to a related description in another embodiment.

The apparatus embodiments described in several embodiments provided in the present application are a merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and the parts displayed as units may or may not be physical components, may be located in one position, or may be distributed on a plurality of network units. Some or all of the units may be selected to achieve the objective of the solution of the embodiment according to actual needs.

In addition, functional units in the embodiments of the present invention may be integrated into one processing unit, or each of the units may exist alone physically, or two or more units may be integrated into one unit. The integrated units may be implemented in a form of hardware, or may be implemented in a form of a software functional unit.

When the integrated units are implemented in a form of a software functional unit and sold or used as an independent product, the integrated units may be stored in a computer-readable storage medium. Based on such an understanding, the technical solutions of the present disclosure essentially, or the part contributing to the prior art, or all or a part of the technical solutions may be implemented in a form of a software product. The computer software product is stored in a storage medium, and includes several instructions for instructing a computer device (which may be a personal computer, a server, or a network device) to perform all or some steps of the methods described in each embodiment of the present invention. The foregoing storage medium includes: any medium that can store program code, such as a USB flash drive, a removable hard disk, a read-only memory (ROM), a random access memory (RAM), a removable hard disk, a magnetic disk, or an optical disc.

It is understood that the foregoing are merely preferred embodiments of the present invention and that various changes and alterations can be made by a person of ordinary skill in the art without departing from the principle and these changes and alterations shall fall within the scope of the technical solutions of the present disclosure.

What is claimed is:

1. An image processing method, comprising:
at a computing device having one or more processors and memory storing programs executed by the one or more processors;
obtaining an two-dimensional image;
determining a target area on the two-dimensional image, wherein the two-dimensional image includes a background area and a target area, and the background area is an area outside of the target area;
detecting a location of the target area on the two-dimensional image;
selecting, according to the location of the target area on the two-dimensional image, a default processing manner used to perform blurring processing on pixels of the background area; and
performing the blurring processing on the pixels of the background area according to the default processing manner;

wherein the detecting a location of the target area on the two-dimensional image comprises:
calculating a first deviation factor of a center location of the target area and a center location of the two-dimensional image, wherein the first deviation factor is used to reflect a degree that the center location of the target area deviates from the center location of the two-dimensional image;
calculating a second deviation factor of the target area and a boundary of the two-dimensional image, wherein the second deviation factor is used to reflect a degree that the target area deviates from a boundary of the two-dimensional image;
judging whether the first deviation factor is smaller than the second deviation factor;
determining that the target area is within a first area when it is judged that the first deviation factor is smaller than the second deviation factor, wherein the first area is an area towards a center location of the two-dimensional image; and
determining that the target area is within a second area when it is judged that the first deviation factor is equal to or larger than the second deviation factor, wherein the second area is an area towards a boundary of the two-dimensional image.

2. The image processing method according to claim 1, wherein:
selecting, according to the location of the target area on the two-dimensional image, a default processing manner used to perform blurring processing on pixels of the background area comprises: selecting a first processing manner after determining that the target area is within the first area, wherein the first processing manner is used to perform gradient blurring processing on the pixels of the background area in a first direction, wherein the first direction is a direction from a boundary of the target area to a boundary of the two-dimensional image corresponding to the boundary of the target area,
performing the blurring processing on the pixels of the background area according to the default processing manner comprises: performing the gradient blurring processing on the pixels of the background area according to the first processing manner.

3. The image processing method according to claim 2, wherein the performing the gradient blurring processing on the pixels of the background area comprises:
determining starting boundaries and ending boundaries for performing the blurring processing on the pixels of the background area; and
performing the gradient blurring processing on the pixels of the background area between the starting boundaries and the ending boundaries, wherein a blurring degree of pixels at a starting boundary is less than a blurring degree of pixels at an ending boundary.

4. The image processing method according to claim 1, wherein:
selecting, according to the location of the target area on the two-dimensional image, a default processing manner used to perform blurring processing on pixels of the background area comprises: selecting a second processing manner after determining that the target area is within the second area, wherein the second processing manner is used to perform gradient blurring processing on the pixels of the background area in a second direction, wherein the second direction is a direction from a boundary nearest to the target area to a boundary farthest to the target area on the two-dimensional image,
performing the blurring processing on the pixels of the background area according to the default processing manner comprises: performing the gradient blurring processing on the pixels of the background area according to the second processing manner.

5. The image processing method according to claim 1, wherein before the detecting a location of the target area on the two-dimensional image, the image processing method further comprises:
calculating a width ratio between width of the target area and width of the two-dimensional image;
calculating a length ratio between length of the target area and length of the two-dimensional image;
judging whether the width ratio exceeds a first ratio threshold, and judging whether the length ratio exceeds a second ratio threshold,
wherein if the width ratio exceeds the first ratio threshold and the length ratio exceeds the second ratio threshold, performing gradient blurring processing on the pixels of the background area in a default direction, wherein the default direction is a preset direction used for performing the gradient blurring processing on the pixels of the background area.

6. The image processing method according to claim 1, wherein:
after the determining a target area on the two-dimensional image, the image processing method further comprises: performing average blurring processing on the pixels of the background to obtain a background average blurring image, wherein the average blurring processing is used to make pixels everywhere of the background average blurring image have the same blurring degree, and
performing the blurring processing on the pixels of the background area according to the default processing manner comprises: obtaining the pixels of the background and pixels on the background average blurring image; determining calculation parameters for performing gradient blurring processing on the pixels of the background area by using the default processing manner; and calculating pixels obtained after the gradient blurring processing on the background area according to the calculation parameters, the pixels of the background area, and the pixels on the background average blurring image.

7. An image processing apparatus, comprising a plurality of program modules comprising computer-implemented instructions stored in memory of a computing device and executed by one or more processors of the computing device, the plurality program modules comprising:
an obtaining unit, configured to obtain a two-dimensional image;
a determining unit, configured to determine a target area on the two-dimensional image, wherein the two-dimensional image includes a background area and a target area, and the background area is an area outside of the target area;
a detecting unit, configured to detect a location of the target area on the two-dimensional image;
a selecting unit, configured to select, according to the location of the target area on the two-dimensional image, a default processing manner used to perform blurring processing on pixels of the background area; and a first processing unit, configured to perform the blurring processing on the pixels of the background area according to the default processing manner;

wherein the detecting unit comprises:
a first calculating module, configured to calculate a first deviation factor of a center location of the target area and a center location of the two-dimensional image, wherein the first deviation factor is used to reflect a degree that the center location of the target area deviates from the center location of the two-dimensional image;

a second calculating module, configured to calculate a second deviation factor of the target area and a boundary of the two-dimensional image, wherein the second deviation factor is used to reflect a degree that the target area deviates from a boundary of the two-dimensional image;

a judging module, configured to judge whether the first deviation factor is smaller than the second deviation factor;

a first determining module, configured to, when it is judged that the first deviation factor is smaller than the second deviation factor, determine that the target area is within a first area, wherein the first area is an area towards the center location of the two-dimensional image; and a second determining module, configured to, when it is judged that the first deviation factor is equal to or larger than the second deviation factor, determine that the target area is within a second area, wherein the second area is an area towards a boundary of the two-dimensional image.

8. The image processing apparatus according to claim 7, wherein:
the selecting unit comprises: a first selecting module, configured to select a first processing manner after determining that the target area is within the first area, wherein the first processing manner is used to perform gradient blurring processing on the pixels of the background area in a first direction, wherein the first direction is a direction from a boundary of the target area to a boundary of the two-dimensional image corresponding to the boundary of the target area, and the first processing unit comprises: a first processing module, configured to perform the gradient blurring processing on the pixels of the background area according to the first processing manner.

9. The image processing apparatus according to claim 8, wherein the following submodules are adopted to perform the gradient blurring processing on the pixels of the background area:
a determining submodule, configured to determine starting boundaries and ending boundaries for performing blurring processing on the pixels of the background area; and a processing submodule, configured to perform the gradient blurring processing on the pixels of the background area between the starting boundaries and the ending boundaries, wherein a blurring degree of pixels at a starting boundary is less than a blurring degree of pixels at an ending boundary.

10. The image processing apparatus according to claim 7, wherein:
the selecting unit comprises: a second selecting module, configured to select a second processing manner after determining that the target area is within the second area, wherein the second processing manner is used to perform gradient blurring processing on the pixels of the background area in a second direction, wherein the second direction is a direction from a boundary nearest to the target area to a boundary farthest to the target area on the two-dimensional image, and the first processing unit comprises: a second processing module, configured to perform the gradient blurring processing on the pixels of the background area according to the second processing manner.

11. The image processing apparatus according to claim 7, wherein the image processing apparatus comprises:
a first calculating unit, configured to calculate a width ratio between width of the target area and width of the two-dimensional image before the location of the target area on the two-dimensional image is detected;

a second calculating unit, configured to calculate a length ratio between length of the target area and length of the two-dimensional image; and a judging unit, configured to judge whether the width ratio exceeds a first ratio threshold, and judging whether the length ratio exceeds a second ratio threshold, wherein the first processing unit is also configured to, if the width ratio exceeds the first ratio threshold and the length ratio exceeds the second ratio threshold, perform gradient blurring processing on the pixels of the background area in a default direction, wherein the default direction is a preset direction used for performing the gradient blurring processing on the pixels of the background area.

12. The image processing apparatus according to claim 7, wherein:
the image processing apparatus further comprises: a second processing unit, configured to, after the target area on the two-dimensional image is determined, perform average blurring processing on the pixels of the background to obtain a background average blurring image, wherein the average blurring processing is used to make pixels everywhere of the background average blurring image have the same blurring degree, and the first processing unit comprises: an obtaining module, configured to obtain the pixels of the background area and pixels on the background average blurring image; a third determining module, configured to determine calculation parameters for performing gradient blurring processing on the pixels of the background area by using the default processing manner; and a third calculating unit, configured to calculate pixels obtained after the gradient blurring processing on the background area according to the calculation parameters, the pixels of the background area, and the pixels on the background average blurring image.

* * * * *